(12) United States Patent
Rieck et al.

(10) Patent No.: US 7,992,371 B2
(45) Date of Patent: Aug. 9, 2011

(54) STALK ROLL WITH COATING

(75) Inventors: Steven Timothy Rieck, Cambridge, IL (US); Timothy Franklin Christensen, Moline, IL (US)

(73) Assignee: Deere & Company, Moline, IL (US)

( * ) Notice: Subject to any disclaimer, the term of this patent is extended or adjusted under 35 U.S.C. 154(b) by 64 days.

(21) Appl. No.: 12/421,204

(22) Filed: Apr. 9, 2009

(65) Prior Publication Data

US 2010/0043371 A1  Feb. 25, 2010

Related U.S. Application Data

(60) Provisional application No. 61/090,765, filed on Aug. 21, 2008.

(51) Int. Cl.
*A01D 45/02* (2006.01)

(52) U.S. Cl. ............... 56/104; 460/28; 460/29; 460/32; 460/38

(58) Field of Classification Search ............. 56/104, 56/109, 110, 116, 117, 52; 460/26–38; 492/60, 492/28, 30
See application file for complete search history.

(56) References Cited

U.S. PATENT DOCUMENTS

| | | | | |
|---|---|---|---|---|
| 2,779,337 | A | * | 1/1957 | Tener .............................. 460/37 |
| 4,924,609 | A | * | 5/1990 | Martin ............................ 37/465 |
| 5,040,361 | A | * | 8/1991 | Briesemeister .................. 56/52 |
| 5,404,699 | A | * | 4/1995 | Christensen et al. ........... 56/104 |

* cited by examiner

*Primary Examiner* — Alicia M Torres
(74) *Attorney, Agent, or Firm* — C. Garrett Bonsell

(57) ABSTRACT

A stalk roll for an agricultural harvester row unit comprising a plurality of longitudinal extending knife edges about its circumference, in which one of the leading and trailing sides of the knife edges is coated with a first wear resistant coating over substantially its entire length, and in which the other of the leading and trailing sides is coated with a second wear resistant coating over at least one of a front portion thereof and a rear portion thereof.

12 Claims, 4 Drawing Sheets

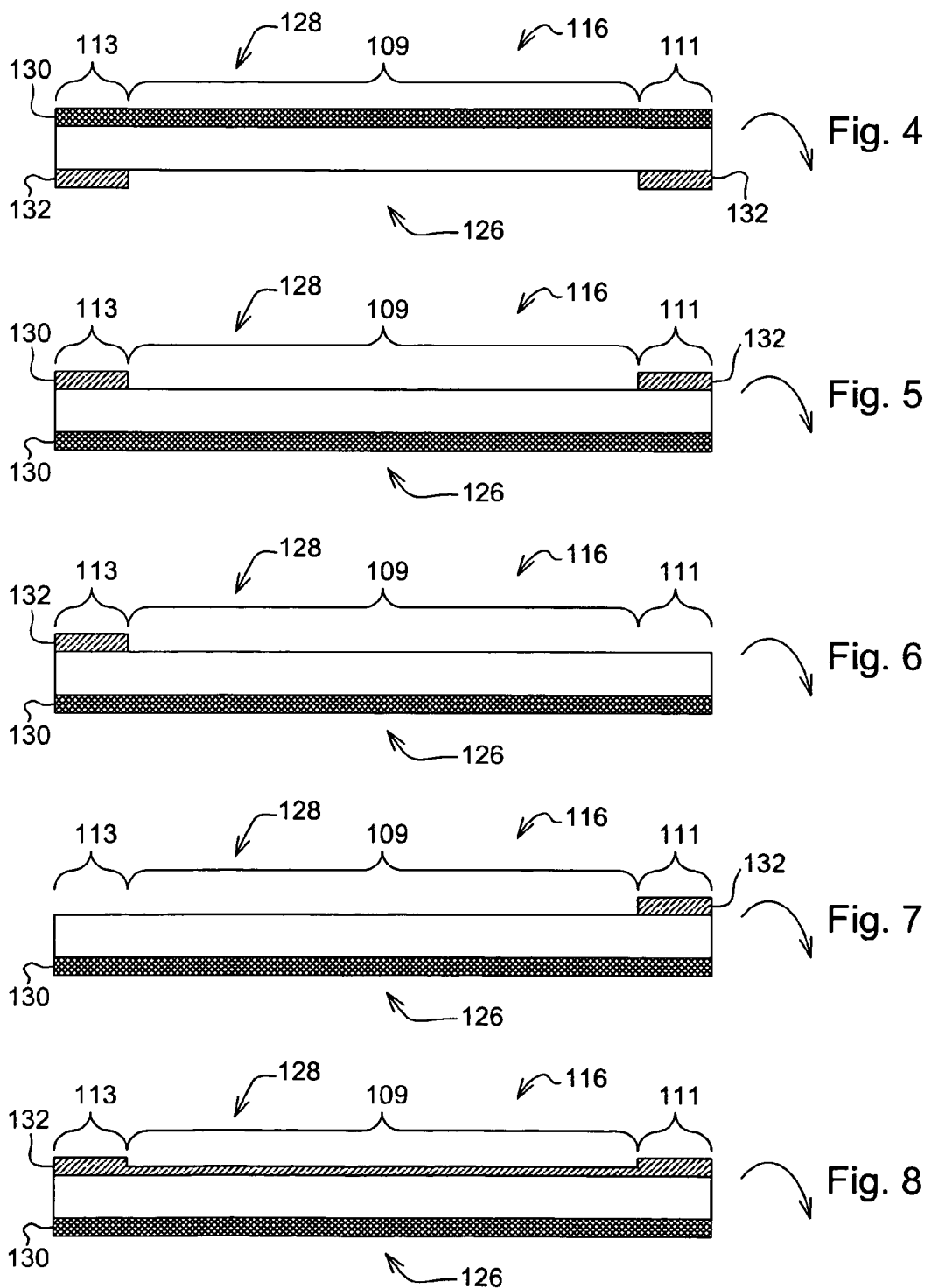

STALK ROLL WITH COATING

CROSS REFERENCE TO RELATED APPLICATIONS

This is a non-provisional application based upon U.S. provisional patent application Ser. No. 61/090,765 entitled "STALK ROLL KNIFE EDGE COATING FOR EXTENDED WEAR LIFE", filed Aug. 21, 2008, which is incorporated herein by reference.

FIELD OF THE DISCLOSURE

The present disclosure relates to stalk rolls for row units of agricultural harvesters and, more particularly, to stalk roll knife edge coatings.

BACKGROUND OF THE DISCLOSURE

Agricultural harvesters use row units for separating ears of corn from plant stalks. Row units are disposed along the leading edge of a harvesting head, and the harvesting head is mounted to the harvester vehicle portion of the agricultural harvester. Row units typically include two forwardly extending, rotating stalk rolls.

Stalk rolls are usually arranged as adjacent elongated cylinders and mounted on elongated rotating shafts. Such an arrangement forms a narrow space between the stalk rolls. The stalk rolls receive the plant stalk in the narrow space that is formed between the stalk rolls. As the stalk rolls rotate, they grasp the plant stalk and pull it downward using knife edges. Then, a stripper plate, disposed above the stalk rolls, pulls ears of corn from the plant stalk. Subsequently, the ears of corn are conveyed rearward, leaving room for the stalk rolls to receive another plant stalk.

Protrusions disposed on the outside surfaces of the stalk rolls perform the grasping operation just mentioned. Typically, the protrusions are in the form of knife edges. Such edges grasp the stalk by penetrating into it and pulling it downward. This contact, between the stalk and the stalk rolls, creates significant wear on the knife edges.

The applicants have identified a wear pattern that is common to many knife edges: the wear at the front and rear portions of the knife edges tends to be greater than the wear at the central portions. This pattern is due to the nature of the stalk segments that are grasped at each portion along the knife edges.

At the front portions, where the stalk rolls first grasp the base segments of the stalks, the stalks are large in diameter and contaminated with dirt and minerals. Thus, there is usually more wear on the front portions of the knife edges than on the middle portions. At the central portions, as the stalks are pulled downwards and backwards along the length of the knife edges, the stalks are smaller in diameter and cleaner. This is why there tends to be less wear on the central portions. At the rear portions, the knife edges must sometimes grasp and pull down longer segments of the stalks than the front and central portions must poll down. Because of this, there tends to be more wear on the rear portions than on the middle portions.

The applicants propose to provide an optimum wear coating on each knife edge that addresses this nonlineariiy of wear and reduces costs. It is an object of this invention to provide such a wear coating.

SUMMARY OF THE INVENTION

In accordance with a first aspect of the invention, a stalk roll for an agricultural harvester row unit is provided comprising a plurality of longitudinal extending knife edges about its circumference. The sides of the knife edges are hardened or coated differently as a function of their length.

One of the leading and trailing sides of the knife edges may be coated with a first wear resistant coating over substantially its entire length. The other of the leading and trailing sides may be coated with a second wear resistant coating over at least one of a front portion of a knife edge thereof and a rear portion of the knife edge thereof. Exemplarily, the front portion may range from 25 mm to 100 mm in length, and the rear portion may range from 5 mm to 50 mm in length.

To assist in maintaining sharp knife edges, the first and second wear resistant coatings may have different levels of hardness to cause one edge to erode before the other. To do this, the difference in Rockwell C hardness between the leading and trailing sides may need to be greater than 5 points. Exemplarily, the wear resistant coating may comprise tungsten carbide, HVOF, or other similar materials.

BRIEF DESCRIPTION OF THE DRAWINGS

FIG. 4 is a fragmentary plan view of a typical knife edge of the stalk roll of FIG. 3 viewed in a direction perpendicular to the longitudinal axis of the stalk roll taken at line 4-4.

FIG. 5 is a fragmentary plan view of an alternative knife edge of the stalk roll of FIG. 3 with an alternative coating arrangement viewed in a direction perpendicular to the longitudinal axis of the stalk roll taken at line 4-4.

FIG. 6 is a fragmentary plan view of another knife edge of the stalk roll of FIG. 3 with an alternative coating arrangement viewed in a direction perpendicular to the longitudinal axis of the stalk roll taken at line 4-4.

FIG. 7 is a fragmentary plan view of an additional knife edge of the stalk roll of FIG. 3 with an alternative coating arrangement viewed in a direction perpendicular to the longitudinal axis of the stalk roll taken at line 4-4.

FIG. 8 is a fragmentary plan view of another typical knife edge of the stalk roll of FIG. 3 with an alternative coating arrangement viewed in a direction perpendicular to the longitudinal axis of the stalk roll taken at line 4-4.

DETAILED DESCRIPTION OF THE DRAWINGS

Figure 1:
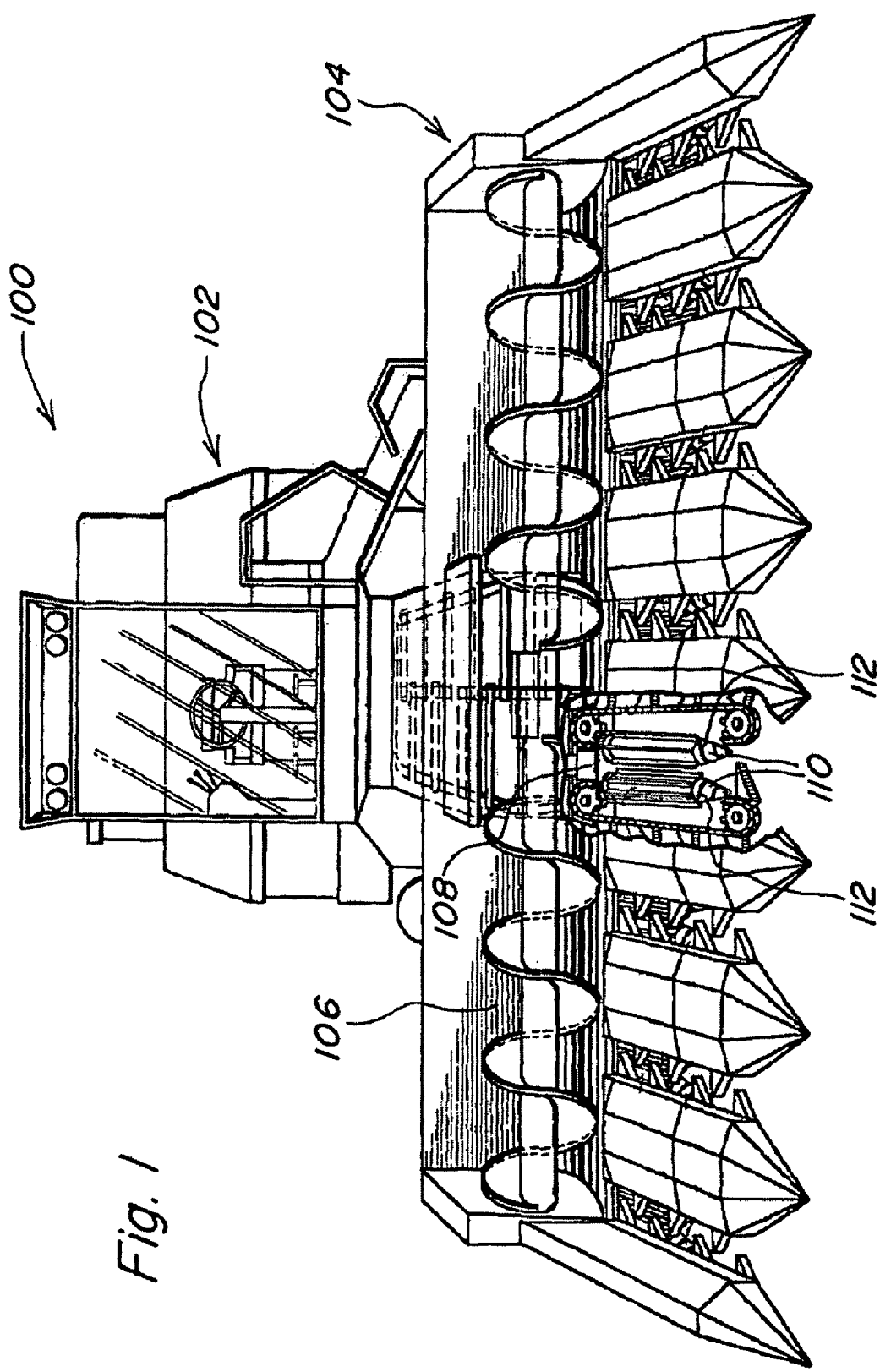
FIG. 1 illustrates an agricultural harvester having a corn head with row units comprising stalk rolls in accordance with the present invention.

Referring now to FIG. 1, an agricultural harvester 100 comprises an agricultural harvester vehicle 102 to which a corn head 104 is mounted. The corn head 104 comprises a chassis 106 and a plurality of row units 108.

The row units 108 are mounted on the chassis 106 in a side to side relationship extending across the width of the corn head 104. Each row unit 108 has two forwardly extending stalk rolls 110 that extend forward from the corn head 104 and are spaced apart to receive corn stalks in the gap defined between the two stalk rolls 110. The forward portion of each stalk roll 110 is pointed and has a spiral flute 112 to provide a gradually narrowing gap configured to receive the stalks of corn plants.

Figure 2:
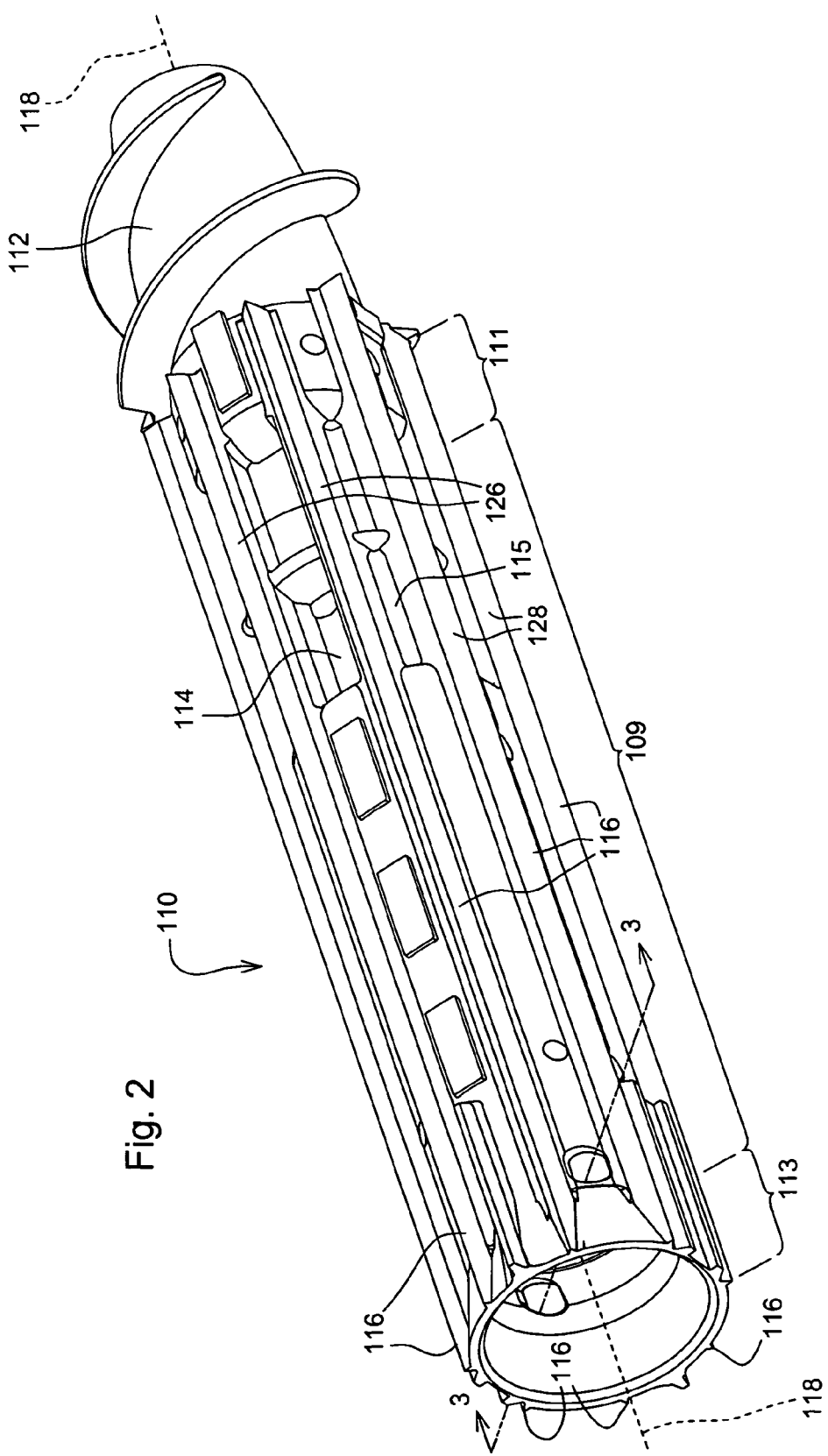
FIG. 2 is a perspective view of one of the stalk rolls of FIG. 1.

Referring now to FIG. 2, an exemplary one of the stalk rolls 110 is shown in perspective view. The stalk roll 110 comprises a plurality of elongated knife edges 116 that extend outward from outer surface 115 of a cylindrical body 114 of the stalk roll 110. The knife edges 116 extend substantially the entire length of the cylindrical body 114 and generally parallel to longitudinal axis 118.

The knife edges 116 comprise a leading side 126 and a trailing side 128. The leading side 126 approaches the stalk first as the stalk roll rotates. The trailing side 128 is disposed away from the plant stalk. The knife edges 116 have front portions 111, central portions 109, and rear portions 113.

Figure 3:
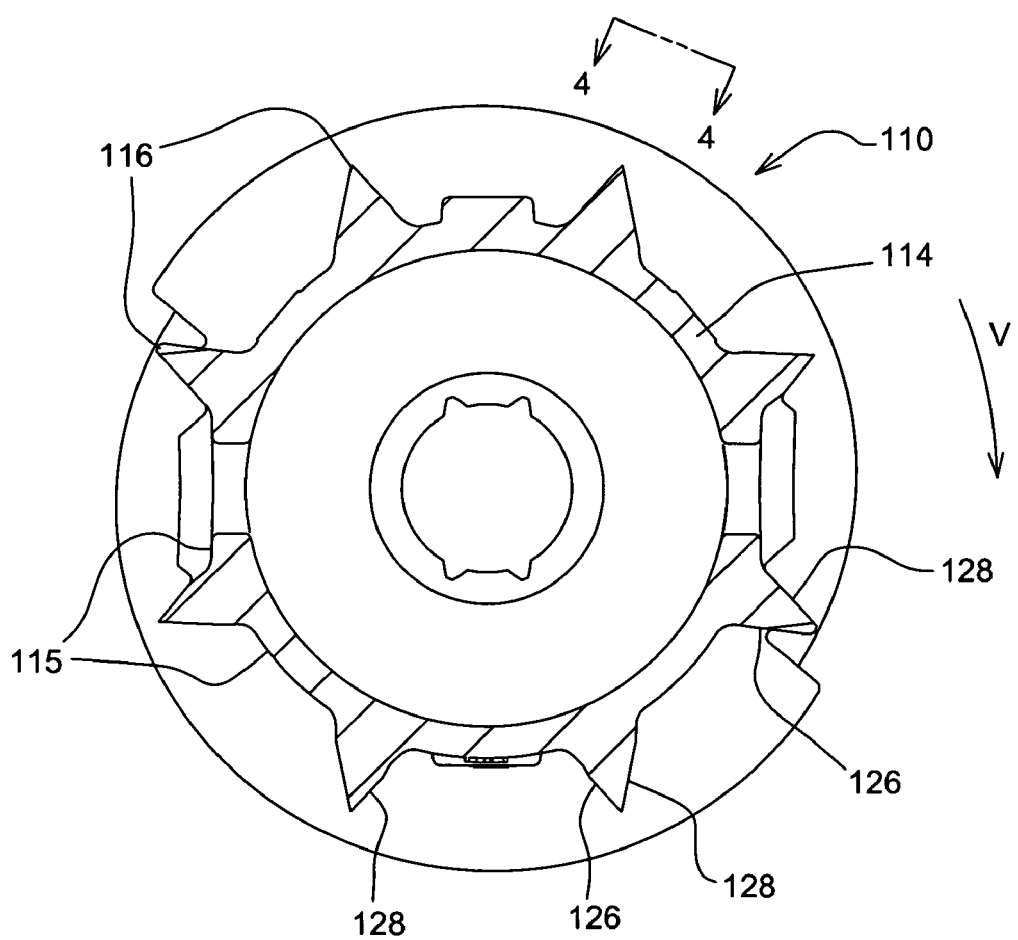
FIG. 3 is a sectional view of the stalk roll of FIG. 2 taken at section line 3-3.

Referring now to FIG. 3, there is a section view of the stalk roll of FIG. 2 taken at section line 3-3. As shown, the stalk roll 110 rotates in the clockwise direction. The knife edges 116 extend outward from the outer surface 115 of the cylindrical body 114. Although there are eight knife edges 116 shown on the stalk roll 110, there may be more than eight knife edges 116 or fewer than eight knife edges 116. In addition, the knife edges 116 do not need to be generally, evenly distributed about the outer surface 115.

All of the knife edges 116 comprise a leading side 126 and a trailing side 128. The leading side 126 approaches the stalk first as the stalk roll 110 rotates. The trailing side 128 is disposed away from the stalk.

Referring now to FIG. 4, there is a fragmentary plan view of a typical knife edge 116 of the stalk roll 110 of FIG. 3 perpendicular to the longitudinal axis of the stalk roll 110 taken at line 4-4.

In the embodiment of FIG. 4, the trailing side 128 is coated with a first wear resistant coating 130 over substantially its entire length, and the leading side 126 is coated with a second wear resistant coating 132 over the front and rear portions 111, 113. Neither the first wear resistant coating 130 nor the second wear resistant coating 132 is on the central portion 109 of the leading side 126.

FIG. 6 is a fragmentary plan view of an alternative knife edge 116 of the stalk roll 110 of FIG. 3 perpendicular to the longitudinal axis of the stalk roll 116 taken at line 4-4.

In the embodiment of FIG. 5, the leading side 126 is coated with the first wear resistant coating 130 over substantially its entire length, and the trailing side 128 is coated with the second wear resistant coating 132 over the front and rear portions 111, 113. Neither the first wear resistant coating 130 nor the second wear resistant coating 132 is on the central portion 100 of the trailing side 128.

FIG. 6 is a fragmentary plan view of another knife edge 116 of the stalk roll 110 of FIG. 3 perpendicular to the longitudinal axis of the stalk roll 110 taken at section line 4-4.

In the embodiment of FIG. 6, the leading side 126 is coated with the first wear resistant coating 130 over substantially its entire length, and the trailing side 128 is coated with the second wear resistant coating 132 over the rear portion 113. Neither the first wear resistant coating 130 nor the second wear resistant coating 132 is on the central or front portions 100, 111 of the trailing side 130.

FIG. 7 is a fragmentary plan view of an additional knife edge 116 of the stalk roll 110 of FIG. 3 perpendicular to the longitudinal axis of the stalk roll 110 taken at section line 4-4.

In the embodiment of FIG. 7, the leading side 126 is coated with the first wear resistant coating 130 over substantially its entire length, and the trailing side 128 is coated with the second wear resistant coating 132 over the front portion 111. Neither the first wear resistant coating 130 nor the second wear resistant coating 132 is on the central or rear portions 109, 113 of the trailing side 128.

FIG. 8 is a fragmentary plan view of another typical knife edge 116 of the stalk roll 110 of FIG. 3 perpendicular to the longitudinal axis of the stalk roll 110 taken at line 4-4.

In the embodiment of FIG. 8, the leading side 126 is coated with the first wear resistant coating 130 over substantially its entire length, and the trailing side 128 is coated with the second wear resistant coating 132 over the front and rear portions 111, 113. Additionally, in this embodiment, the central portion 109 of the trailing side 128 has a layer of the second wear resistant coating 132 that is thinner than the layer of the second wear resistant coating 132 that is applied to the front and rear portions 111, 113.

To assist in maintaining sharp knife edges 116, the first and second wear resistant coatings 130, 132 along the leading and trailing sides 126, 128 may be different in chemical composition or thickness. This causes either the leading side 126 or the trailing side 128 to erode before the other, which results in self sharpening knife edges 116.

To maintain sharp knife edges 116 in this fashion, the difference in Rockwell C hardness between the leading and trailing sides 126, 128 may need to be greater than 5 points. The first and second wear resistant coatings 130, 132 may comprise tungsten carbide, HVOF, or other hard coatings.

Although the invention has been described in terms of specific embodiments and applications, persons skilled in the art can, in light of this teaching, generate additional embodiments without exceeding the scope or departing from the spirit of the claimed invention. For example, the stalk roll 110 may contain more or less than eight knife blades 116. As an additional example, the knife blades 116 may be bolted on to the stalk roll 110. As a further example, the application of the first and second wear resistant coatings 130, 132 to the knife blades 116 is not limited to just the embodiments shown in the Figures.

The invention claimed is:

1. A stalk roll for an agricultural harvester row unit comprising an elongate body having a front portion that is closer to a direction of travel of the stalk roll than a rear portion and a plurality of longitudinal extending knife edges disposed about a circumference of the elongate body, wherein each of the plurality of longitudinally extending knife edges has a leading side disposed to face toward a direction of rotation of the elongate body and has a trailing side opposite the leading side and disposed to face away from the direction of rotation of the elongate body, and further in which one of the leading and trailing sides of the plurality of knife edges is coated with a first wear resistant coating over substantially its entire length, in which the other of the leading and trailing sides is coated with a second wear resistant coating over at least one of a front portion thereof and a rear portion thereof, and is not coated over a central portion thereof.

2. The stalk roll of claim 1, in which the front portion of the knife edges comprises at least the front 25 mm length of the longitudinal extending knife edges.

3. The stalk roll of claim 1, in which the rear portion of the knife edges comprises at least the rear 5 mm length of the longitudinal extending knife edges.

4. The stalk roll of claim 3, in which the front portion of the knife edges comprises at least the front 25 mm length of the longitudinal extending knife edges.

5. The stalk roll of claim 1, in which the first wear resistant coating has a first Rockwell C hardness, and the second wear resistant coating has a second Rockwell C hardness.

6. The stalk roll of claim 5, in which the difference in the first Rockwell C hardness and the second Rockwell C hardness is greater than 5 points on the Rockwell C hardness scale.

7. An agricultural harvester comprising a row unit and a stalk roll, in which the stalk roll comprises an elongate body having a front portion that is closer to a direction of travel of the stalk roll than a rear portion and a plurality of longitudinal extending knife edges about the circumference of the elongate body, wherein each of the plurality of longitudinally extending knife edges has a leading side disposed to face toward a direction of rotation of the elongate body and has a trailing side opposite the leading side and disposed to face away from the direction of rotation of the elongate body, and further in which one of the leading and trailing sides of the knife edges is coated with a first wear resistant coating over substantially its entire length, in which the other of the leading and trailing sides is coated with a second wear resistant coating over at least one of a front portion thereof and a rear portion thereof, and is not coated over a central portion thereof.

8. The agricultural harvester of claim 7, in which the front portion of the knife edges comprises at least the front 25 mm length of the front end of the longitudinal extending knife edges.

9. The agricultural harvester of claim 7, in which the rear portion of the knife edges comprises at least the rear 5 mm length of the rear end of the longitudinal extending knife edges.

10. The agricultural harvester of claim 7, in which the front portion of the knife edges comprises at least the front 25 mm length of the front end of the longitudinal extending knife edges, and in which the rear portion of the knife edges comprises at least the rear 5 mm length of the rear end of the longitudinal extending knife edges.

11. The agricultural harvester of claim 7, in which the first wear resistant coating has a first Rockwell C hardness, and the second wear resistant coating has a second Rockwell C hardness.

12. The agricultural harvester comprising a row unit and a stalk of claim 11, in which the difference in the first Rockwell C hardness and the second Rockwell C hardness is greater than 5 points on the Rockwell C hardness scale.

* * * * *